(12) United States Patent
Gonzalez-Rivas

(10) Patent No.: US 7,860,742 B1
(45) Date of Patent: Dec. 28, 2010

(54) OFFLINE TO ONLINE MARKETING PROGRAM TO INCENTIVIZE TELEVISION VIEWERS TO PARTICIPATE IN AN INTERACTIVE INTERNET CONTEST

(76) Inventor: Carlos G. Gonzalez-Rivas, 4417 Prairie Willow Ct., Concord, CA (US) 94521

( * ) Notice: Subject to any disclaimer, the term of this patent is extended or adjusted under 35 U.S.C. 154(b) by 3779 days.

(21) Appl. No.: 09/882,511

(22) Filed: Jun. 15, 2001

(51) Int. Cl.
*G06Q 30/00* (2006.01)

(52) U.S. Cl. .............................. 705/14; 705/10; 725/39

(58) Field of Classification Search ................... 705/14
See application file for complete search history.

(56) References Cited

U.S. PATENT DOCUMENTS

| | | | |
|---|---|---|---|
| 5,933,811 A | 8/1999 | Angles et al. | |
| 5,961,603 A | 10/1999 | Kunkel et al. | |
| 6,049,539 A | 4/2000 | Lee et al. | |
| 2003/0036944 A1* | 2/2003 | Lesandrini et al. | 705/10 |

OTHER PUBLICATIONS

Vanessa O'Connell. Bacardi Brings Out the Bottle in Cable-TV Ad for Amaretto—Spot is Firm's First to Blatantly Display Product. May 2, 2001. The Wall Street Journal Europe. p. 25.*
Rachel Emma Silverman and Suzanne Vranica. Job-Hunting Web Sites' Ads Will Duel at Super Bowl. Jan. 23, 2001. The Wall Street Journal. p. B.8.*
Internet Archives WayBack Machine. Monster.com. http://web.archive.org/web/20010418150929/momentum.monster.com/ from Apr. 18, 2001.*

* cited by examiner

*Primary Examiner*—Namrata Boveja
(74) *Attorney, Agent, or Firm*—Reinhart, Boerner Van Deuren S.C.

(57) ABSTRACT

An improved method of marketing is disclosed in which in which a particular marketing website logo is displayed during a television commercial, following which consumers who viewed the commercial can log onto the marketing website and participate in an interactive online contest which will increase awareness of the advertised product or service and thereby reinforce the offline television advertising seen by the consumers. The marketing website offers incentives to consumers who view television commercials and in response log onto the site, so that when consumers view a television commercial which displays the marketing website logo, they will immediately associate the logo with the marketing website and with the opportunity to either obtain something desirable or, more particularly, the opportunity to win a substantial prize at no cost to them. Thus, there exists an incentive which many consumers will find highly desirable, making them highly motivated to move to the second phase of the commercial, which thus extends far beyond the brief seconds of the actual television commercial in further increasing advertised product awareness and reinforcing the television commercial itself.

28 Claims, 8 Drawing Sheets

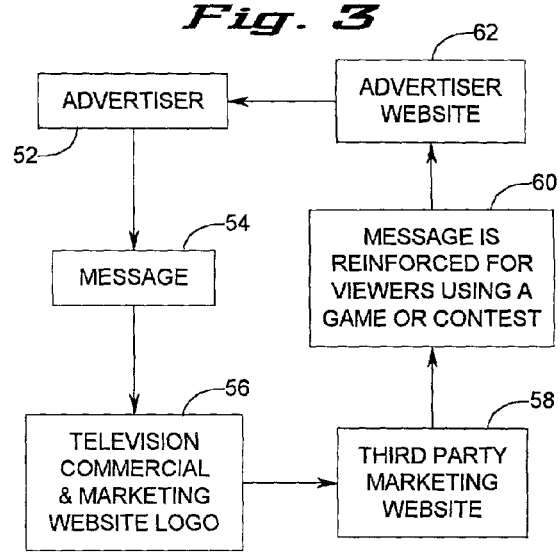
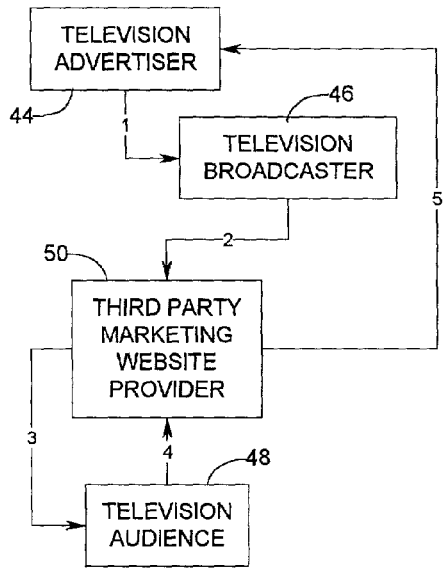
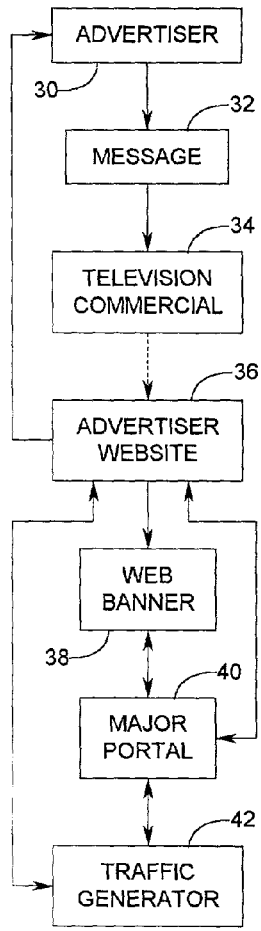
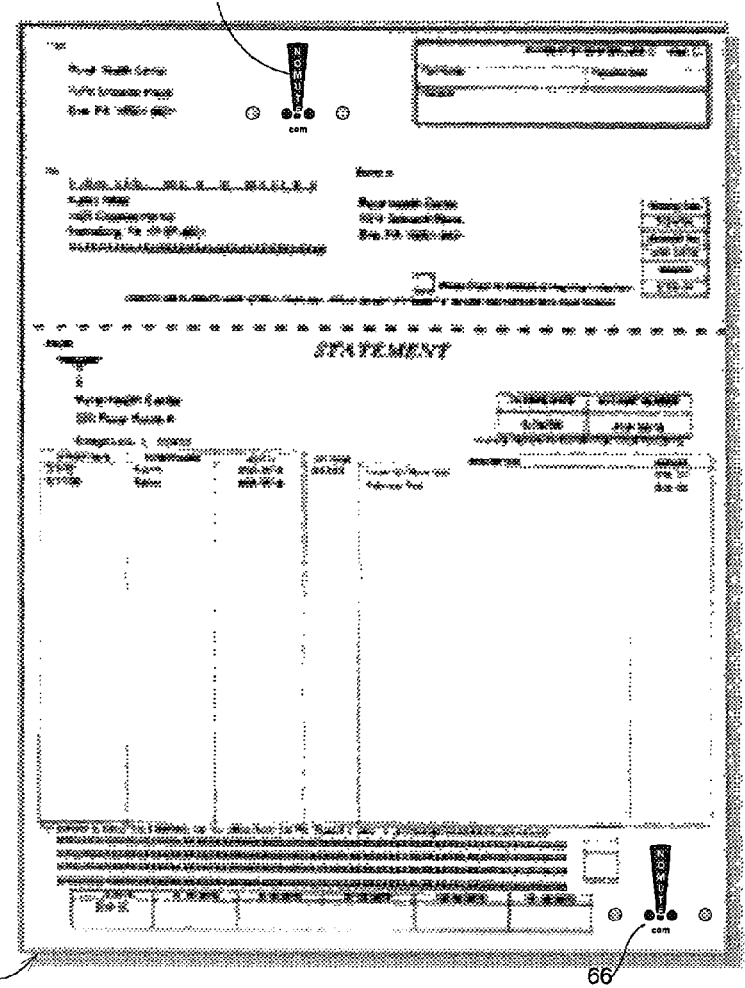

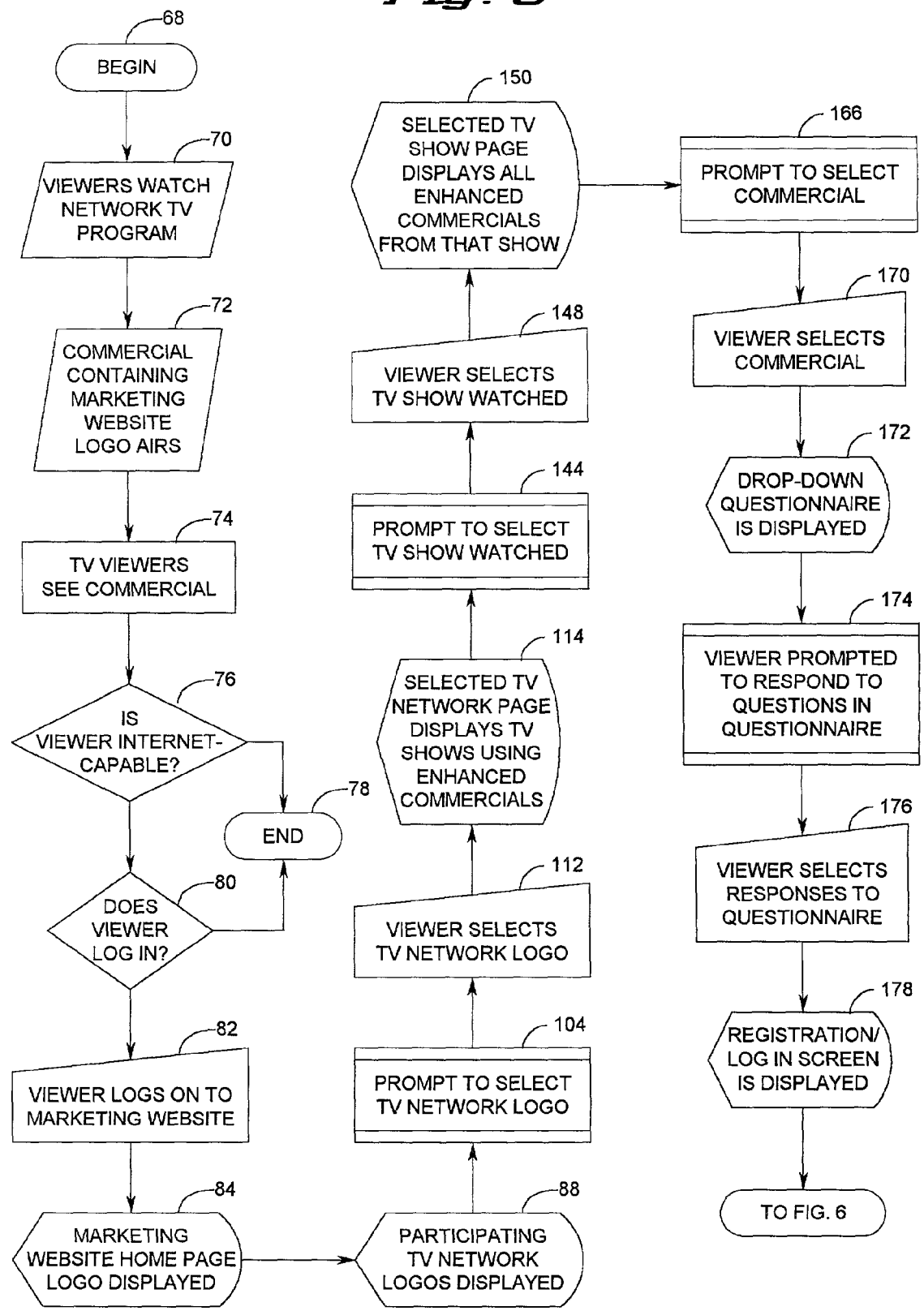

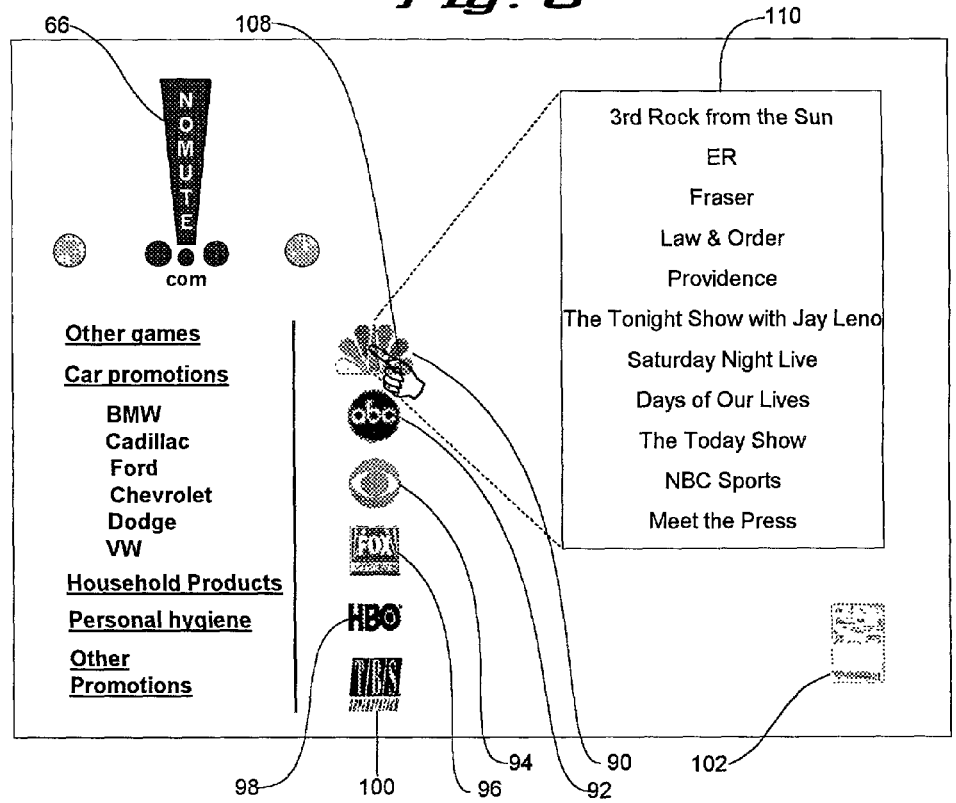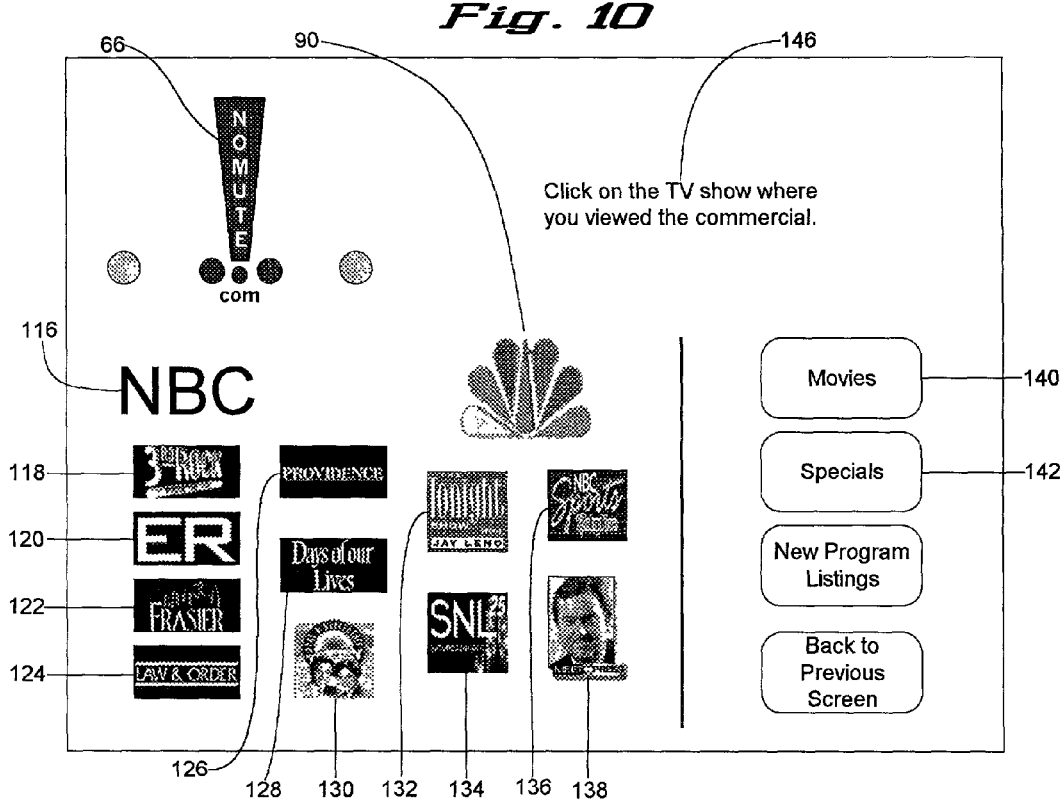

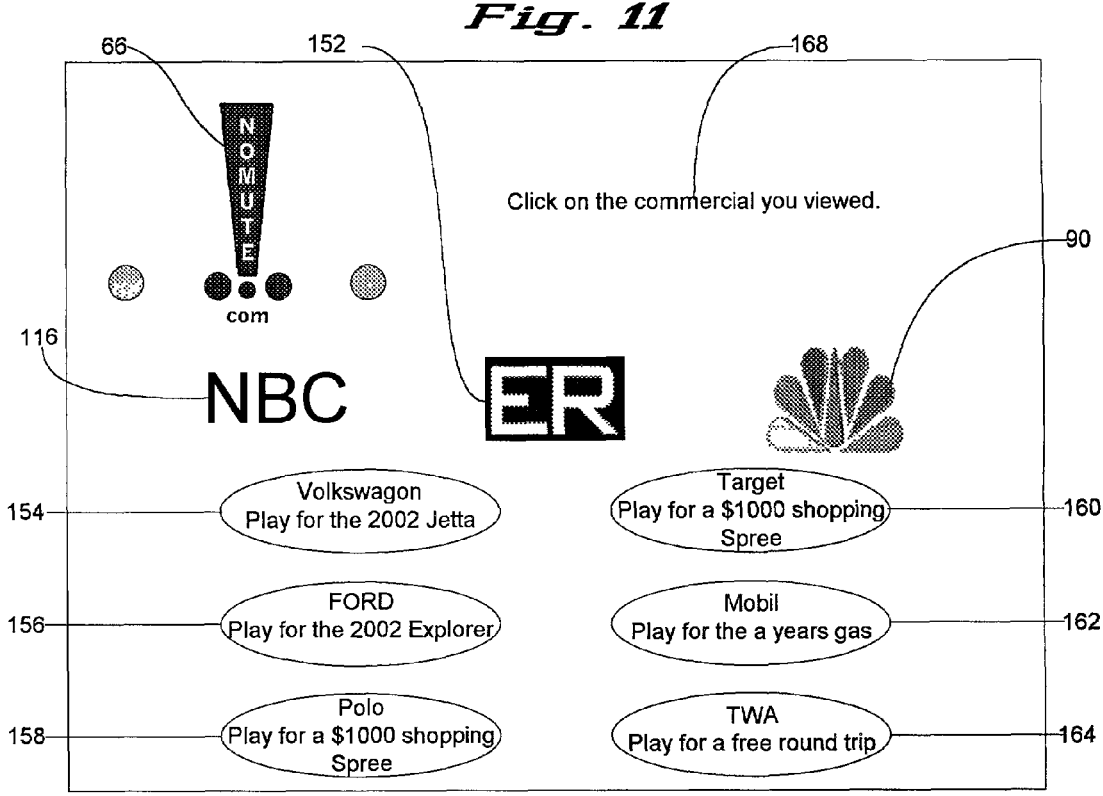
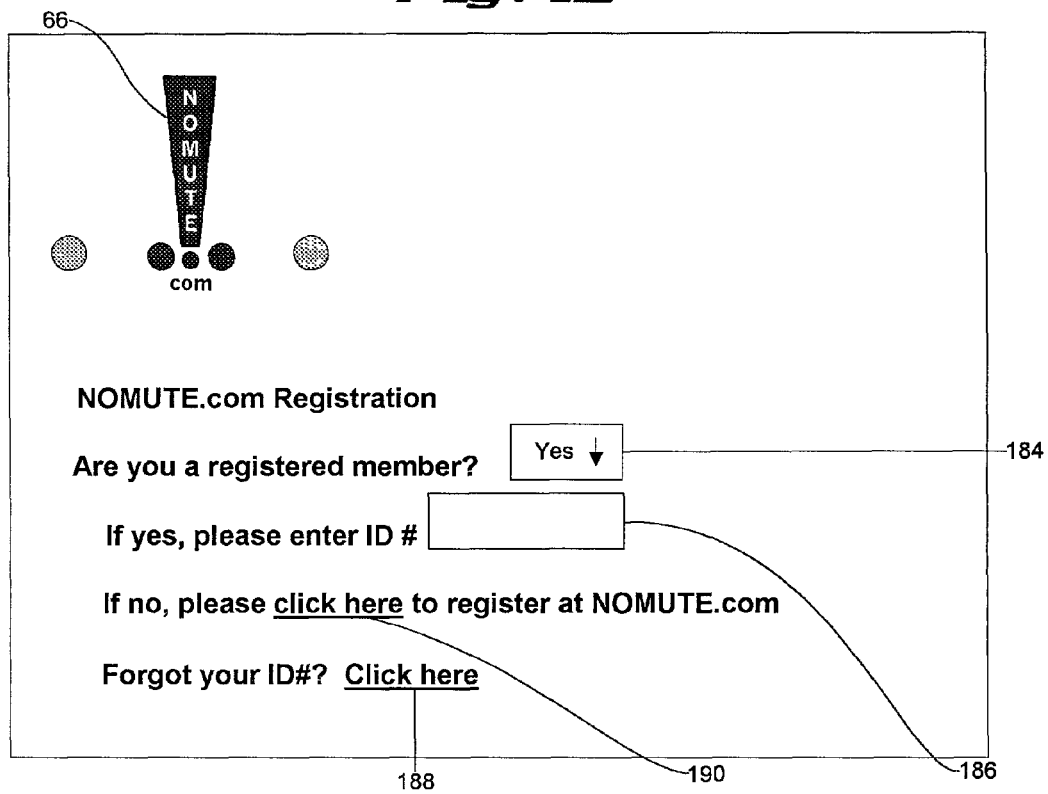

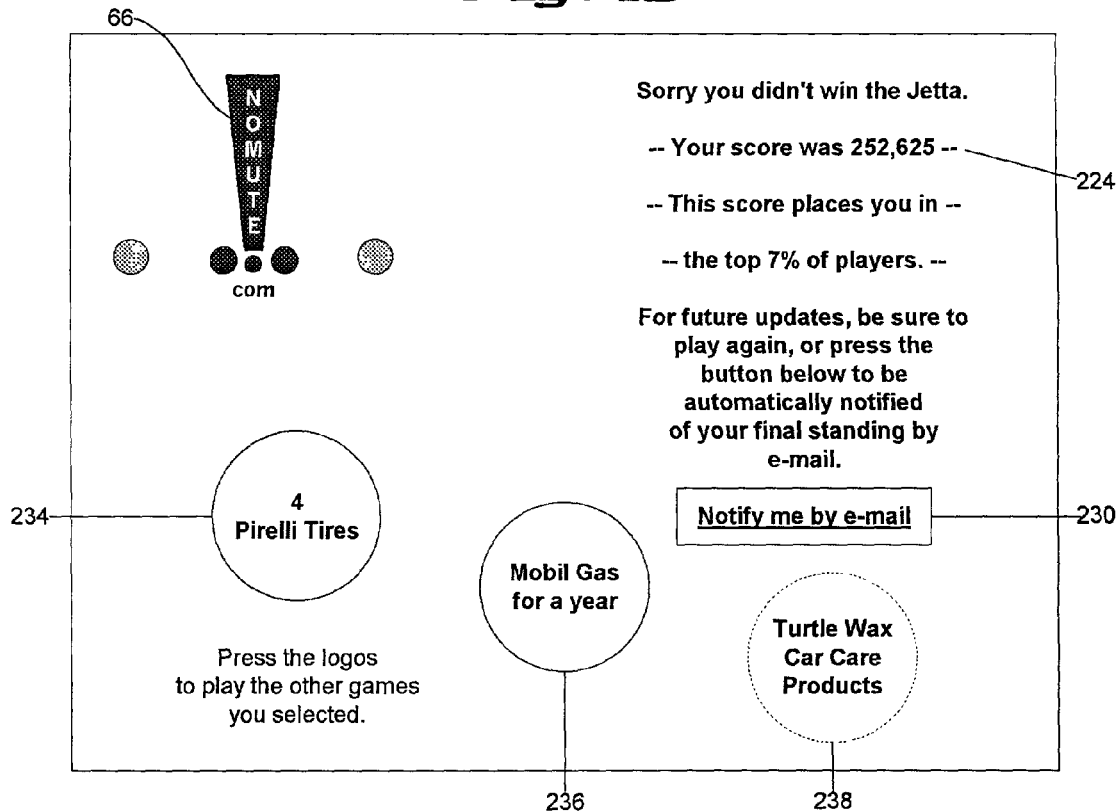
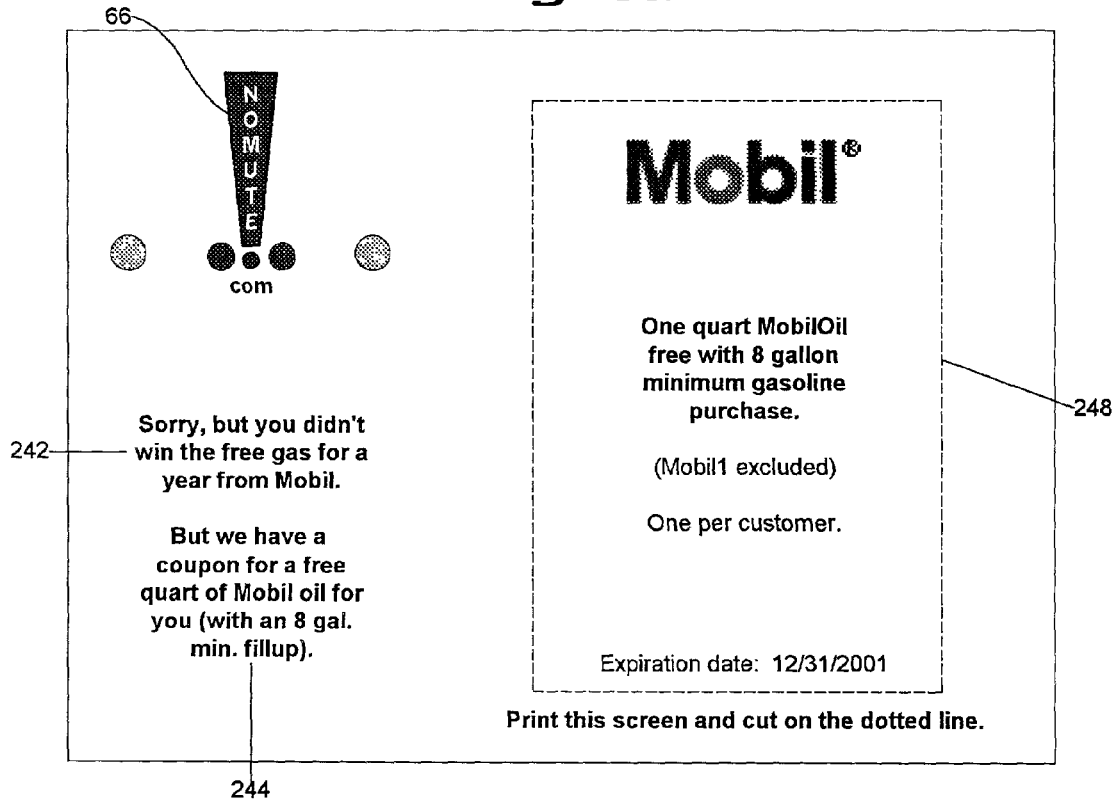

OFFLINE TO ONLINE MARKETING PROGRAM TO INCENTIVIZE TELEVISION VIEWERS TO PARTICIPATE IN AN INTERACTIVE INTERNET CONTEST

BACKGROUND OF THE INVENTION

Field of the Invention

The present invention relates generally to the field of marketing, and more particularly to an improved method of marketing in which a particular marketing website logo is displayed during a television commercial and consumers who viewed the commercial can log onto the marketing website and participate in an interactive online contest which will increase awareness of the advertised product or service and thereby reinforce the offline television advertising seen by the consumers.

Historically, television advertising has been one of the more effective methods of reaching consumers on a large scale. However, several advances in technology have adversely affected the impact of television advertising and its ability to reach consumers. From the outset of television, viewers of commercial television have been exposed to television commercials which aired at intervals during each television program. Initially, the only way that consumers would not see the commercials airing during the programs they were watching was if they left the room during the commercials. Even then, they could often at least hear the commercials, even if they were not viewing them, unless they used the "mute" button on the television's remote control.

The first challenge to the conventional use of advertising in television came with cable, in which large numbers of viewers began to pay for a service which had previously been free. The initial fear of advertisers was twofold: first that commercial-free cable programming would detract from advertising-supported television's viewership, and second that the bulk of cable would prove to be commercial free. Neither of these fears proved to be significantly detrimental to advertising-supported television, since most cable channels use commercials, and since television viewership has steadily increased, actually bringing more viewers to advertising-supported television programming.

With the advent of the videotape recorder in the late 1970's, a portion of consumers began to tape television shows rather than watching them at the time they aired. Using the videotape recorder's remote control, they were able to "zap" commercials by moving through them at high speed, thereby for the first time preventing the commercials from being viewed as they were intended to be. Some videotape recorders even included a "commercial skip" feature which, when a button on the videotape recorder's remote control used to select the feature was pressed, would jump ahead by a fixed amount of time (such as 30 seconds) on the videotape. However, most consumers have used videotape recorders primarily to time-shift, recording television shows when they would have been otherwise unable to view them.

More recently, a new technology has begun to emerge that presents a substantially greater threat to the viability of television advertising. The technology of hard disk drive-based digital video recorders, which allows viewers to "pause" live television also allows the consumers to skip completely through the commercials (in 30 second increments) so long as the viewer is not watching live. Thus, by beginning to watch television shows shortly after they have begun rather than when they are airing live, consumers can completely skip the television commercials. The widespread adoption of this technology potentially represents a disaster for television advertisers, and could threaten the viability of network television since it would make commercial time substantially less valuable, thereby potentially undermining the subsidization of network broadcasting by advertisers.

Another recent technological development has been the widespread availability of the Internet. Opportunities for advertising on the Internet have not been lost on corporations and marketers, with advertising taking two fundamentally different approaches on the Internet. The first and better known approach is the information approach, where companies have websites which provide information about themselves and their products. The drawback in this approach is, of course, that viewers must first log onto their websites and request information about their products.

The second approach is the use of embedded advertising, in the form of advertising banners, advertising pop-ups (windows with advertising content which open automatically from the main window), and targeted e-mail (also referred to as "spam"). The use of pop-ups and spam generally annoys most Internet users, and they are inclined to delete the windows or spam immediately. Software has increasingly focussed on preventing pop-ups and on automatically filtering out spam. Accordingly, it will be readily appreciated that the Internet to date has proven to be a difficult field in which to run an effective marketing program.

At the present time, there have not been significant linkages between television advertising and Internet-based advertising. For the most part, they have been viewed as being alternate channels through which to reach viewers, rather than in any way providing a synergistic result by having their uses combined into a carefully thought out marketing program. Television advertising has for the most part continued on its path without significant change, other than occasionally including advertisers' Internet website addresses in the closing portion of their television commercials. The Internet has, for the most part, been a disappointment for advertisers, and at the present time is generally regarded as being inferior to television advertising both in terms of total audience response measurement and in terms of total advertising dollars earned.

It is accordingly the primary objective of the present invention that it combine television advertising with advertising use of the Internet in order to create an offline to online marketing program which achieves synergistic advantages over the use of separate television and Internet advertising campaigns. It is a related objective of the offline to online marketing program of the present invention that it augment the performance level of television advertising only and that it produce a verifiable increase in consumer awareness of the products or services advertised on television. It is another related objective of the offline to online marketing program of the present invention that it provide consumers with an incentive which will function to make them become more aware of the television commercials and which will also cause them to log on to the marketing program website, thereby presenting the opportunity to target them with further marketing information.

It is a further objective of the offline to online marketing program of the present invention that it act to build both a lasting memory of television advertising and a relationship between consumers and advertisers which are substantially greater than those which presently exist. It is yet another objective of the offline to online marketing program of the present invention that it provide a source of marketing demographics which, rather than being collected in arduous processes which involve projections and estimates, are provided by the consumers themselves, and thus are necessarily both complete and accurate. It is still another objective of the offline to online marketing program of the present invention that it require little change to be made in offline television ads in order to produce the synergistic and advantageous results mentioned above.

The offline to online marketing program of the present invention must also produce results which are achievable over an extended period of time with a variety of different advertised products and services, with the offline to online marketing program requiring few or no enhancements to be made to it for use with the various different products and services which are marketed. In order to enhance the market appeal of the offline to online marketing program of the present invention, it should also be economical both to implement and to operate to thereby afford it the broadest possible market. Finally, it is also an objective that all of the aforesaid advantages and objectives of the offline to online marketing program of the present invention be achieved without incurring any substantial relative disadvantage.

SUMMARY OF THE INVENTION

The disadvantages and limitations of the background art discussed above are overcome by the present invention. With this invention, an improved method of marketing which has two fundamental steps is utilized. In the first step, a distinctive logo identifying a particular marketing website is displayed during a television commercial. In the second step, consumers who viewed the commercial can log onto the marketing website and participate in an interactive online game or contest which will function to increase their awareness of the advertised product or service and thereby reinforce the offline television advertising seen by them.

The first step is the more simple in that in the preferred embodiment the only change which is made to existing television commercials is the addition of the distinctive logo identifying the marketing website of the offline to online marketing program of the present invention. In the preferred embodiment, the address of the marketing website is contained in a stylized logo which has a distinctive appearance which will soon become well-recognized by consumers viewing television commercials. The marketing website logo may be displayed in a corner of the television screen during the entire commercial. In this way, the marketing website logo will indicate to consumers viewing the television commercials that by logging on to the marketing website identified by the marketing website logo, they can obtain additional information about the advertised product or service which is the subject of the commercial.

The second step utilized by the offline to online marketing program of the present invention involves the marketing website identified by the marketing website logo. However, the fact that there is a marketing website which is identified by the marketing website logo displayed during a television commercial is only a small part of the innovative nature of the marketing website. The more significant characteristic of the marketing website is that it offers incentives to consumers who view television commercials and in response log onto the site, and this characteristic is where the offline to online marketing program of the present invention radically departs from past marketing efforts to combine television and the Internet.

The key to attracting consumers who view television commercials to the marketing website is to offer an incentive to them so that when they view a television commercial which displays the marketing website logo, they will immediately associate the logo with the marketing website and with the opportunity to either obtain something desirable or, more particularly, the opportunity to win a substantial prize at no cost to them. Thus, by logging on to the marketing website, they will afford themselves the opportunity to become a winner. It will thus be appreciated that in this concept there exists an incentive which many consumers will find highly desirable, making them highly motivated to move to the second phase of the commercial, which extends far beyond the brief seconds of their viewing of the actual television commercial.

It will also be appreciated that is it desirable to be able to offer this feature to a plurality of suppliers of products and services rather than limit it to a single product or service. Accordingly, the marketing website has to provide a way for consumers who view television commercials to find their way to each particular television advertiser's area. Accordingly, the marketing website provides a series of screens which will quickly guide a consumer to the screen associated with the particular television commercial which has brought the consumer to the marketing website.

In the preferred embodiment, this is accomplished by first providing the consumer with a choice of television networks on which he or she may have seen the particular television commercial. Each television network which is presenting television commercials which are associated with the marketing website logo is listed on a particular screen, and the consumer is instructed to select the particular network on which the particular television commercial aired. The consumer selects the television network upon which the particular television commercial aired by placing the mouse cursor on the button identifying that television network, and clicking the button of the mouse.

This causes the marketing website to provide a screen which lists the television shows on the selected television network during which television commercials which are associated with the marketing website logo aired. The consumer selects the correct television show by placing the mouse cursor on the button identifying that television network upon which the particular television commercial aired, and again clicking the button of the mouse.

This causes the marketing website to provide a screen which lists the television commercials associated with the marketing website logo which aired during the selected television show. The prize which is being offered in the game or contest associated with each of the depicted television commercials is also described in this screen. (For example, a car may be the prize in the game or contest associated with a television commercial the subject of which is that car.) The consumer selects the desired television commercial by placing the mouse cursor on the button identifying the particular television commercial, and once again clicking the button of the mouse.

In the preferred embodiment, this brings up a login/registration screen in which the consumer is asked to log in if he or she has previously registered with the marketing website, or, alternately, to register with the marketing website. The registration process requires the consumer to provide information which may include the consumer's name, address, e-mail address, and various demographic information which as age, sex, salary bracket, etc. This may be easily accomplished using drop-down menus allowing the consumer to easily select the correct category. This step may also be used to exclude minors who are legally prohibited from competing in the contest.

Following this step, the initial game or contest screen will be displayed. In the preferred embodiment, in this screen the consumer is presented with the option to participate in up to two additional games or contests which are sponsored by the suppliers of goods or services which are related to the product or service which was advertised in the particular television commercial. This has the effect of presenting advertising information on products or services which are in a category in which the consumer has already demonstrated an interest by participating in the game or contest relating to the particular product or service.

Following the consumer either electing or declining to participate in one or two additional contests or games, the process moves to the game or contest relating to the product or service which was the subject of the television commercial. While it will be appreciated that the game or contest could take many different formats, the goal of the game or contest is to reinforce the message of the television commercial—namely, that the product or service being advertised is desirable and its purchase would be gratifying to the consumer. Thus, by using a "message memory" format of game or contest in which the consumer is rewarded for paying close attention to the television commercial, the consumer's viewing habits can actually be modified to cause the consumer to pay closer attention to television commercials in which the marketing website logo appears.

By way of example, the form of the game or contest may be an interactive game in which the consumer re-experiences the advertised product or service through his or her participation. The consumer may be challenged to recreate a streaming media scene from the television commercial within a certain time frame and, if successful, then be entered into a drawing to win the product, another award, or a monetary prize. Another example would require a consumer to answer questions about the product or service which was the subject of the television commercial. It will be readily apparent to those skilled in the art that many other formats could be used with equal success at reinforcing the advertising message.

In addition to reinforcing the advertising message, another benefit derived from the offline to online marketing program of the present invention is the generation of marketing information. Since the basic demographics of consumers accessing the marketing website are provided by the consumers themselves, it will be apparent that the offline to online marketing program represents an invaluable marketing resource for generating information relating to the product or service, the television commercial, or other facets of the marketing program.

Following completion of the primary game or contest, the consumer will then play the games or contests for the related products or services, if selected. They may proceed in much the same way as described above. Alternately for either the primary or secondary games or contests, the consumer may actually win online, with the prize either being mailed directly to the consumer, or a coupon for a free product or service being displayed on the screen for the consumer to print.

Even if the prize which the consumer was playing for is not won, the consumer may still be rewarded with a discount coupon for the advertised product or service or, more likely, for a smaller product or service. Such coupons can be displayed on the screen for the consumer to print.

Additional follow up may be provided in the form of later contacts with the consumer, most likely by conventional e-mail, but alternately by telephone call, pager alert, wireless e-mail, or by providing a toll-free telephone number for the consumer to call to see if he or she has won a contest in which he or she was entered by virtue of his or her participation in the game or contest. The last of these alternatives may be referred to as a "telephone e-mail" system, in which consumers can enter his or her ID and password on the telephone to check to see whether he or she has won, with a brief message further reinforcing the advertising for the product or service advertised in the television commercial being presented in the process. In addition, it will be appreciated that the entire offline to online marketing program of the present invention operates in a closed loop reinforcement fashion in that it will encourage consumers to pay closer attention to television commercials which include the marketing website logo therein.

It may therefore be seen that the present invention teaches a combination of television advertising with advertising use of the Internet in order to create an offline to online marketing program which achieves synergistic advantages over the use of separate television and Internet advertising campaigns. The offline to online marketing program of the present invention augments the performance level of television advertising only, and produces a verifiable increase in consumer awareness of the products or services advertised on television. It provides consumers with an incentive which will function to make them become more aware of the television commercials and which will also cause them to log on to the marketing program website, thereby presenting the opportunity to target them with further marketing information.

The offline to online marketing program of the present invention acts to build both a lasting memory of television advertising and a relationship between consumers and advertisers which is substantially greater than that which presently exists. It provides a source of marketing demographics which demographics, rather than being collected in arduous processes which involve projections and estimates, are provided by the consumers themselves, and thus are necessarily both complete and accurate. The offline to online marketing program of the present invention requires little change to be made in offline television ads in order to produce the synergistic and advantageous results mentioned above.

The offline to online marketing program of the present invention produces results which are achievable over an extended period of time with a variety of different advertised products and services, with the offline to online marketing program requiring few or no enhancements to be made to it for use with the various different products and services which are marketed. The offline to online marketing program of the present invention is also economical both to implement and to operate to enhance its market appeal and to thereby afford it the broadest possible market. Finally, all of the aforesaid advantages and objectives of the offline to online marketing program of the present invention are achieved without incurring any substantial relative disadvantage.

DESCRIPTION OF THE DRAWINGS

These and other advantages of the present invention are best understood with reference to the drawings, in which:

FIG. 1 is a schematic flow diagram which shows the process whereby television advertisers presently are able to utilize the Internet to supplement their television advertising;

FIG. 2 is a schematic flow diagram which shows the basic system used by the offline to online marketing program of the present invention, which uses an online marketing website to increase awareness and reinforce the offline television advertising;

FIG. 3 is a schematic flow diagram showing the basic methodology utilized by the system of the offline to online marketing program illustrated in FIG. 2;

FIG. 4 is a paper bill or, alternatively, an online bill which may be delivered to a consumer and which contains a marketing website logo including the web address for the online marketing website illustrated in FIG. 2;

FIG. 5 is the first half of a flow diagram illustrating the process used by the offline to online marketing program of the present invention;

FIG. 9 is a screenshot showing the network selection screen illustrated in FIG. 8, with the cursor located on a particular network logo to show television shows on that network on which commercials using the offline to online marketing program were aired;

FIG. 10 is a screenshot showing a television show selection screen which has been selected from the screenshot illustrated in FIG. 9, and in which the consumer can select the television show on which a particular commercial using the offline to online marketing program was viewed;

FIG. 11 is a screenshot showing a commercial selection screen depicting commercials using the offline to online marketing program which were screened during the television show selected from the screenshot illustrated in FIG. 10, from which the consumer can select a particular commercial;

FIG. 12 is a screenshot showing a registration/login screen in which the consumer is asked to log in if he or she has previously registered or, alternatively, to register;

FIG. 15 is a screenshot shown at the end of the main game informing the consumer of his or her score, enabling updates to be e-mailed, and allowing the consumer to play the other games selected; and FIG. 16 is a screenshot shown at the end of a game which provides a coupon which may be printed and used by the consumer.

DETAILED DESCRIPTION OF THE PREFERRED EMBODIMENT

Figure 6:
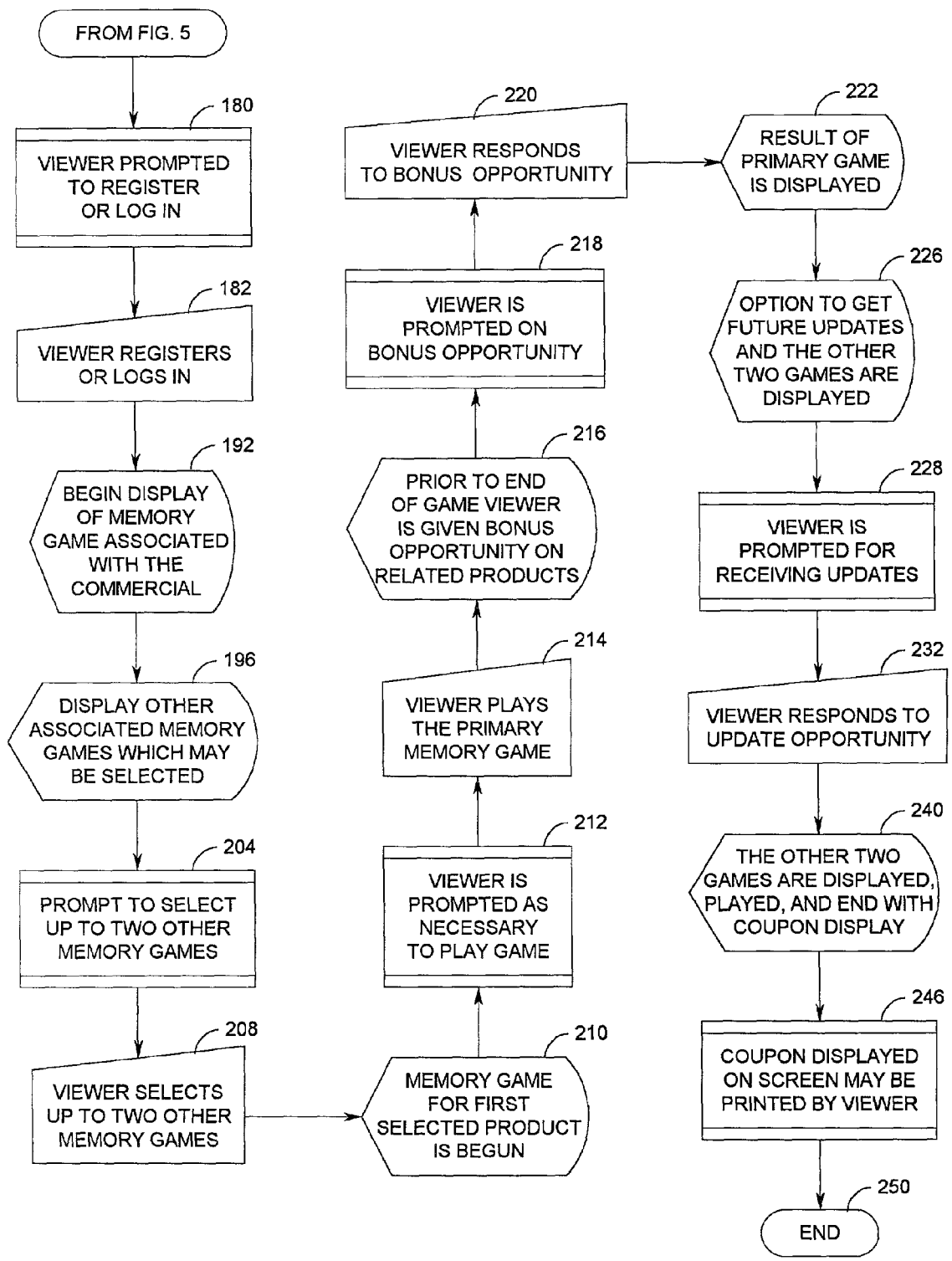
FIG. 6 is the second half of the flow diagram illustrated in FIG. 5.

Prior to beginning a discussion of the operation of the offline to online marketing program of the present invention, it is useful to briefly discuss the way that television advertisers presently attempt to combine television marketing and Internet marketing. Referring then to FIG. 1, the processes presently relied upon by advertisers to attempt to utilize both television advertising and the Internet is shown. An advertiser 30 has a message 32 relating to a product or service which is placed into a television commercial 34. The television commercial 34 is broadcast, and contains therein the address of an advertiser website 36 which is maintained by the advertiser 30.

Unfortunately, it has been the case that the placement of the address of the advertiser website 36 in the television commercial 34 has been substantially less than highly effective. Thus, since the placement of the address of the advertiser website 36 in the television commercial 34 has not been effective, the line from the television commercial 34 to the advertiser website 36 is shown as a dotted line. Most consumers logging on to the advertiser website 36 either go there because they are frequent users of the Internet (and not due to having seen the website address on the television commercial 34), or they arrive there from conventional Internet referral sources such as from a web banner 38 for which the advertiser 30 pays (by clicking on a link contained in the web banner 38), from a major portal 40 in which the advertiser 30 advertises (by clicking on a link contained in the major portal 40), or from another type of traffic generator 42 for which the advertiser 30 pays.

The preferred embodiment of the offline to online marketing program of the present invention solves the problem represented by the inadequate link between the television commercial 34 and the advertiser website 36. Referring to FIG. 2, the four players in the marketing program of the present invention are shown. The first, of course, is a television advertiser 44, which has a product or service which it wishes to advertise. The second player, as is conventional, is a television broadcaster 46, which will broadcast a television commercial supplied by the television advertiser 44.

The third player, also as is conventional, is a television audience 48, which will, of course, view the television commercial. The novel addition to these three players is a fourth player, which is a third party marketing website provider 50. The interaction between these parties is schematically diagrammed in FIG. 2 as follows: 1. the television advertiser 44 provides a television commercial for broadcast to the television broadcaster 46; 2. the television commercial is broadcast by the television broadcaster 46 and includes the marketing website logo of the third party marketing website provider 50; 3. the television commercial with the marketing logo is received by the television audience 48; 4. the television audience 48, recognizing the marketing website logo, log on to the marketing website of the third party marketing website provider 50; and 5. the result of the television audience 48 participating in the marketing website is their increased product awareness of the product or service of the television advertiser 44.

Referring next to FIG. 3, this flow is shown in a different manner, with the process rather than the participants being emphasized. An advertiser 52 has an advertising message 54 which it desires to communicate to consumers via a television commercial. A television commercial 56 which includes a marketing website logo prominently displayed therein and which contains the message 54 is created. It is noteworthy that the marketing website logo-containing television commercial 56 need not be any different from a conventional television commercial, other than in the fact that it includes the marketing website logo of a third party marketing website 58 prominently displayed therein.

The broadcast of the marketing website logo-containing television commercial 56 is of course seen by television viewing consumers, who associate the presence of the marketing website logo with the fact that they will have the opportunity to play a game or win a prize in a contest. This association will be made after a period of initial use in which the third party marketing website provider 50 (FIG. 2) will advertise the meaning of the marketing website logo. It will be appreciated by those skilled in the marketing arts that the exact type of incentive to cause consumers to log on to the third party marketing website 58 may be any of a wide variety of different incentives; the important thing is the recognition by the offline to online marketing program of the present invention that an incentive of some kind will bring extraordinary success to the wedding of television marketing and Internet marketing, yielding a synergistic result far greater than the sum of the parts.

Thus, when consumers log on to the third party marketing website 58, they will be presented with an incentive such as a game or contest, which will provide message reinforcement 60 of the message of the advertiser 52. In an embellishment, the consumers may be provided with a direct link to an advertiser website 62 where the advertiser 52 may provide additional information about the product or service which is the subject of the message 54.

There may optionally be a variety of other tie-ins (other than television commercials) which will act to direct consumers to the third party marketing website 58. For example, in FIG. 4, a billing statement 64 of a supplier of a product or service includes in two places a marketing website logo 66. The use of the marketing website logo 66 on the billing statement 64 will also act to induce consumers to log on to the third party marketing website 58 (FIG. 3). Other uses of the marketing website logo 66 will be readily evident, as for example in print advertisements, telephone advertisements, on billboards, etc.

FIGS. 5 and 6 illustrate process flow diagrams showing at a high level the operation of the offline to online marketing program of the present invention. Referring first to FIG. 5, the first half of this process is illustrated, beginning with a process initiation step 68. From the process initiation step 68, the process moves to a viewing network television broadcast step 70, in which consumers view a chosen television program. Moving next to an enhanced commercial broadcast step 72, on the particular television program on that particular network, a television commercial which contains the marketing website logo airs.

In the next step, a commercial viewing step 74, consumers see the particular commercial which contains the marketing website logo. In the following step in the process, an Internet capability determination step 76, the outcome depends on whether or not a consumer who viewed the particular commercial which contains the marketing website logo is capable of using the Internet. If the consumer is not capable of using the Internet, the process terminates (at least for that particular consumer) in a process termination step 78. If, on the other hand, the consumer is capable of using the Internet, the process moves instead to a marketing website log in determination step 80.

In the marketing website log in determination step 80, a determination is made as to whether the consumer responds to the marketing website logo viewed in the television commercial by logging in to the third party marketing website. If the consumer does not respond by logging on to the third party marketing website, the process terminates (again, at least for that particular consumer) in the process termination step 78. If, on the other hand, the consumer does respond to the marketing website logo viewed in the television commercial by logging in to the third party marketing website, the process instead moves to a consumer log on step 82 which shows the consumer logging on to the third party marketing website.

Figure 7:
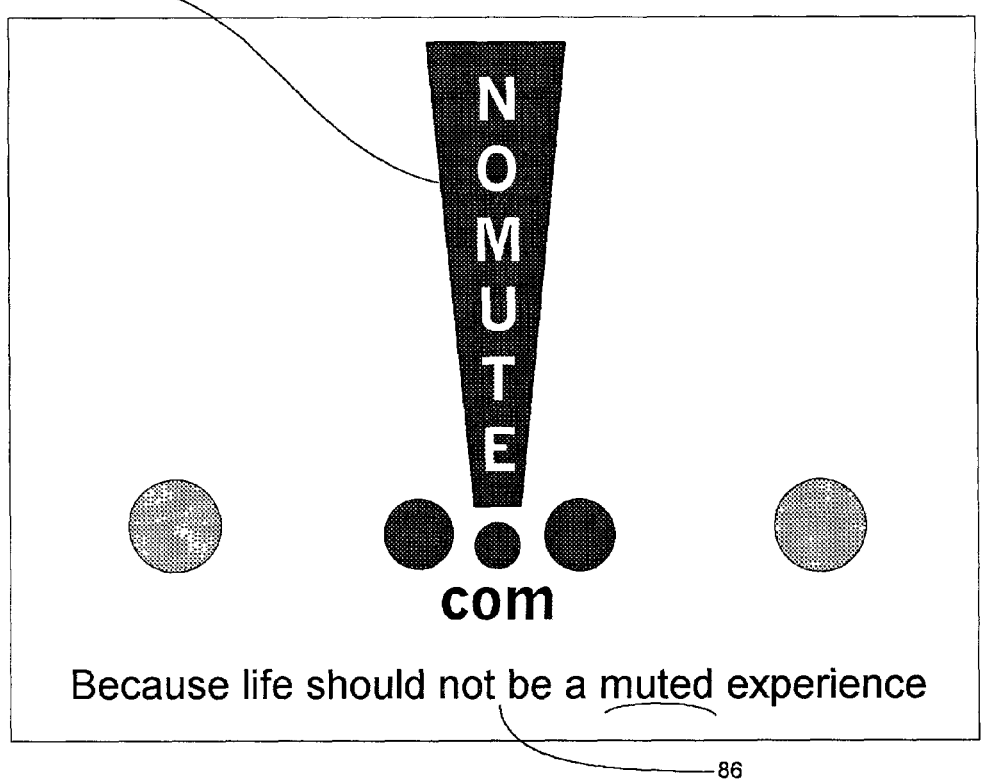
FIG. 7 is a screenshot showing a promotional screen seen for a brief time by a consumer logging on to the online marketing website of the present invention.

From the consumer log on step 82, the process next moves to a display marketing website home page logo step 84 in which the marketing website logo 66 is displayed. Referring to FIG. 7 in addition to FIG. 5, a screenshot of this step as provided by the third party marketing website 58 is shown. Note that below the marketing website logo 66, a slogan 86 of the third party marketing website 58 is displayed. The screenshot shown in FIG. 7 will be displayed for a brief period, typically for between three and ten seconds. From the display marketing website home page logo step 84, the process next moves to a display participating network logos step 88.

Figure 8:
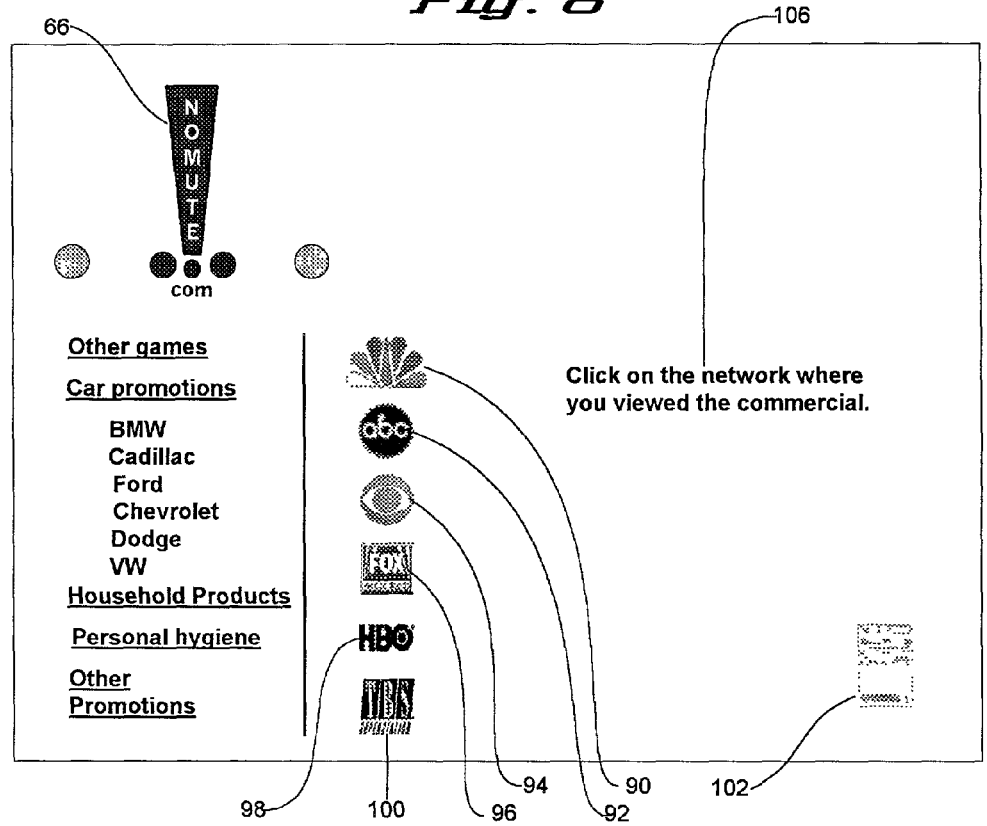
FIG. 8 is a screenshot showing a network selection screen seen by a consumer logging on to the online marketing website of the present invention after the promotional screen illustrated in FIG. 7 disappears, the network selection screen showing television networks on which commercials using the offline to online marketing program were aired.

In the display participating network logos step 88, logos for each of the television networks which are airing television commercials containing the marketing website logo are displayed. Referring now to FIG. 8 in addition to FIG. 5, a screenshot of this step as provided by the third party marketing website is shown. It may be seen that there are six network logos 90, 92, 94, 96, 98, and 100 shown in FIG. 8 on this screenshot. Each of the six network logos 92, 94, 96, 98, and 100 may be used to select the television network on which the consumer saw the particular television commercial which prompted the consumer to log on to the third party marketing website 58.

Note with reference to the optional aspect of the present invention discussed in conjunction with FIG. 4, a biller logo 102 is also illustrated in FIG. 8, which may be used to indicate that it is a paper communication bearing the marketing website logo 66 which originated with the biller who sent the consumer the particular bill which prompted the consumer to log on to the third party marketing website 58. It will thus be appreciated by those skilled in the art that the use of the marketing website logo 66 on placements other than in television commercials may also be used to direct consumers to log on to the third party marketing website 58. Although additional logos are not shown in FIG. 8, as many additional logos may be used as are necessary either for additional television networks in the case of television commercials or for additional non-television network commercial-originated suppliers of goods and services.

From the display participating network logos step 88, the process shown in FIG. 5 next moves to a select television network logo prompt 104 in which the third party marketing website 58 prompts the consumer to select one of the six network logos 90, 92, 94, 96, 98, and 100, as illustrated by the instruction 106 on the screenshot of FIG. 8. This is accomplished by the consumer first placing the mouse cursor 108 of his or her mouse on one of six network logos 90, 92, 94, 96, 98, and 100, as shown in FIG. 9. Upon placement of the mouse cursor 108 on the first network logo 90, a zooming window 110 which lists the television programs which had television commercials which included the marketing website logo therein, all of which shows appeared on the television network which is associated with the first network logo 90.

The next step in the process shown in FIG. 5 is a television network selection step 112. This step is performed by the consumer clicking the mouse button with the mouse cursor 108 on the desired network logos 90, 92, 94, 96, 98, or 100, and causes the process to move to a display television show logos step 114 in which logos for each of the television shown on the selected television network which is airing television commercials containing the marketing website logo are displayed. Referring now to FIG. 10 in addition to FIG. 5, a screenshot of this step as provided by the third party marketing website 58 is shown.

In addition to showing the first network logo 90, the name 116 of that network is also displayed. It may be seen that there are eleven television show logos 118, 120, 122, 124, 126 128, 130, 132, 134, 138, and 138 shown in FIG. 9 on this screenshot. In addition, a movie button 140 and a specials button 142 are also shown in the screenshot. Each of the eleven television show logos 118, 120, 122, 124, 126 128, 130, 132, 134, 138, and 138 may be used to select the television show on which the consumer saw the particular television commercial which prompted the consumer to log on to the third party marketing website 58. The selection of the movie button 140 will bring up a list of recent movies on the selected television network which aired television commercials containing the marketing website logo. Similarly, the selection of the specials button 142 will bring up a list of recent specials on the selected television network which aired television commercials containing the marketing website logo.

From the display television show logos step 114, the process shown in FIG. 5 next moves to a select television show logo prompt 144 in which the third party marketing website 58 prompts the consumer to select one of the eleven television show logos 118, 120, 122, 124, 126 128, 130, 132, 134, 138, and 138 (or the movie button 140 or the specials button 142), as illustrated by the instruction 146 on the screenshot of FIG. 10. This is accomplished by the consumer first placing the mouse cursor (not shown in FIG. 10) of his or her mouse on one of the eleven television show logos 118, 120, 122, 124, 126 128, 130, 132, 134, 138, and 138 (or the movie button 140 or the specials button 142).

The next step in the process shown in FIG. 5 is a television show selection step 148. This step is performed by the consumer clicking the mouse button with the mouse cursor 108 on the desired television show logo 118, 120, 122, 124, 126 128, 130, 132, 134, 138, or 138 (or the movie button 140 or the specials button 142), and causes the process to move to a display enhanced commercials step 150 in which all of the television commercials which aired during the selected television show and also included the marketing website logo are displayed. Referring next to FIG. 11 in addition to FIG. 5, a screenshot of this step as provided by the third party marketing website 58 is shown.

In addition to showing the first network logo 90 and the network name 116, the name 152 of the selected television show is also displayed. It may be seen that there are six buttons shown in FIG. 11 on this screenshot. Each of the six television commercial buttons 154, 156, 158, 160, 162, and 164 may be used to select the particular television commercial which prompted the consumer to log on to the third party marketing website 58. The television commercial buttons 154, 156, 158, 160, 162, and 164 may include information such as the name of the company which manufactures or sells the product or service being advertised, the model name or number of a product or service being advertised, information about the prize being awarded in the game or contest, etc.

From the display enhanced commercials step 150, the process shown in FIG. 5 next moves to a select commercial prompt 166 in which the third party marketing website 58 prompts the consumer to select one of the six television commercial buttons 154, 156, 158, 160, 162, and 164, as illustrated by the instruction 168 on the screenshot of FIG. 11. This is accomplished by the consumer first placing the mouse cursor (not shown in FIG. 11) of his or her mouse on one of the six television commercial buttons 154, 156, 158, 160, 162, and 164.

The next step in the process shown in FIG. 5 is a commercial selection step 170. This step is performed by the consumer clicking the mouse button with the mouse cursor 108 on the desired television commercial button 154, 156, 158, 160, 162, or 164, and causes the process to move to a display questionnaire step 172 in which a drop-down questionnaire is displayed to the consumer. This questionnaire is not displayed in the screenshots. In a respond to questionnaire prompt 174, the consumer is prompted to choose responses from drop-down lists to a plurality of questions.

The questions are typically based on demographics, and will typically include questions on consumer gender, age, relationship status, residential occupancy type and zip, household income and size, and television viewing or radio listening habits. The next step in the process is a response selection step 176 in which the consumer answers the questions. Following this step, the process moves to a display logon/registration step 178. Is should be noted that while the offline to online marketing program of the present invention performs the aforementioned questionnaire steps at this point in the process, they could be moved to another point in the process, or even deleted entirely (but at the loss of significant demographic information).

Referring now to FIG. 12 in addition to FIG. 5, a screenshot displayed at the outset of the display logon/registration step 178 as provided by the third party marketing website 58 is shown. The process next moves from the display logon/registration step 178 of FIG. 5 to a logon/registration prompt 180 shown in FIG. 6 in which the consumer is prompted to log on to the third party marketing website 58 if he or she has previously registered, or, in the alternative, to register. The process next moves to a logon/registration step 182 in which the consumer either logs on or registers.

This process may be discussed in some detail in conjunction with FIG. 12. Since some computer browsers have a feature which will automatically remember both user names and passwords, there is an automatic sign on button 184 upon which the mouse cursor may be placed and the button of the mouse clicked. Other computer browsers only recall the user name, and in this event the consumer will have to enter his or her ID number in an ID number entry box 186. There is also a forgotten ID button 188 upon which the mouse cursor may be placed and the button of the mouse clicked to have the consumer's password e-mailed to him or her.

Figure 13:
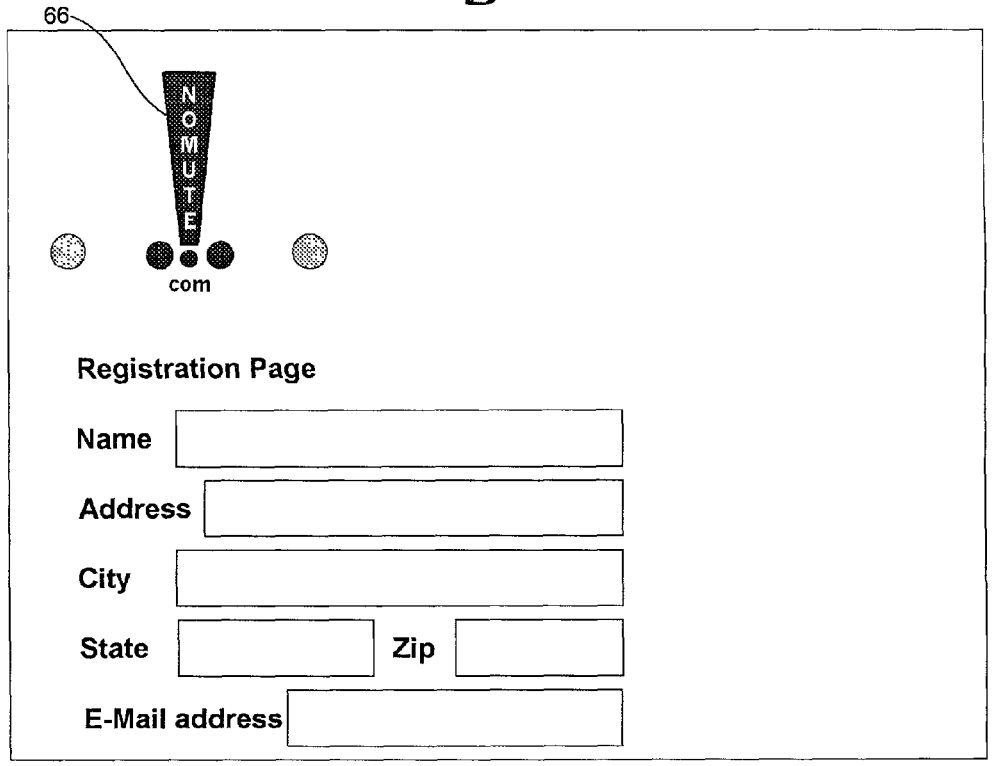
FIG. 13 is a screenshot of a registration screen in which a consumer who has not previously registered is prompted to provide registration information.

In any event, if the consumer is registered with the third party marketing website 58, he or she signs in, completing the logon/registration step 182 (shown in FIG. 6). If, on the other hand, the consumer is not registered with the third party marketing website 58, there is a new user button 190 on which the mouse cursor may be placed and the button of the mouse clicked to begin the registration process, which is shown in FIG. 13. The registration process is well known, and requires the consumer to enter his or her name, address, and e-mail address as a minimum. Additional information may also optionally be required, particularly demographic information if the process of steps 172, 174, and 176 (all shown in FIG. 5) were not required.

Figure 14:
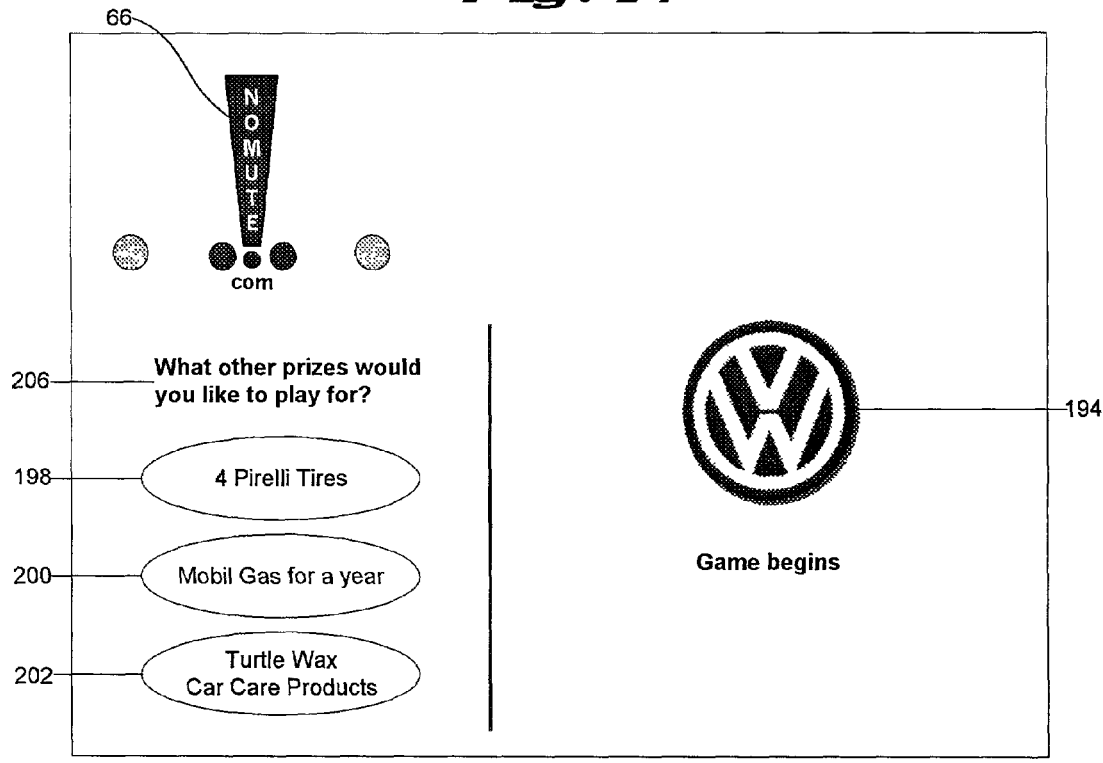
FIG. 14 is a screenshot of the beginning of a game in which the consumer will play for a prize from the manufacturer of the product in the selected commercial, showing the option to play up to two additional games following the main game for prizes which are related to the prize of the main game.

Referring now to FIG. 14 in addition to FIG. 6, the process moves to a begin game display step 192 in which the screenshot shown in FIG. 14 is displayed. It may be seen that an advertiser logo 194 is shown on the right half of the screen. This advertiser logo 194 corresponds with the game selected in the commercial selection step 170 (FIG. 5) by the consumer in selecting the first television commercial button 154 (FIG. 11).

In the next step in the process of the preferred embodiment, an additional game display step 196, the consumer is shown a plurality of other games which may be selected for play after the primary game is player. It may be seen that there are three additional game buttons 198, 200, and 202 shown in FIG. 14 on the screenshot. All three of the products or services associated with the three additional game buttons 198, 200, and 202 are associated in a particular way with the product or service which is associated with the advertiser logo 194. In the example shown in FIG. 14, the product associated with the advertiser logo 194 is an automobile, and the products associated with the additional game buttons 198, 200, and 202 are tires, gasoline, and automobile care products, respectively.

From the additional game display step 196, the process shown in FIG. 6 next moves to a select additional games prompt 204 in which the third party marketing website 58 prompts the consumer to select one of the three additional game buttons 198, 200, and 202, as illustrated by the instruction 206 on the screenshot of FIG. 14. This is accomplished by the consumer first placing the mouse cursor (not shown in FIG. 14) of his or her mouse on one of the three additional game buttons 198, 200, and 202. The next step in the process shown in FIG. 6 is an additional game selection step 208. This step is performed by as the consumer clicking the mouse button on the desired additional game button 198, 200, or 202, and causes the process to move to a begin display of memory game step 210. Note that the consumer could be allowed to select more than one additional game, such as, for example, two additional games, if so desired.

Due to the wide variety of games or contests which could be played, no particular single game or contest is illustrated herein. It will be appreciated by those skilled in the marketing arts that games which tend to reinforce the advertising message are preferred, such as those which will cause consumers to pay more attention to the television commercials displaying the marketing website logo. In the process illustrated in FIG. 6, the next step is a play game prompt 212 in which the consumer is prompted as needed to play the game.

The consumer then plays the primary game, as indicated by a game played step 214. Following the game played step 214, an optional bonus opportunity may be provided to the consumer. In a bonus display step 216, the consumer is provided with an indication that he or she will be able to earn a bonus, and with detail on what needs to be done in order to earn that bonus. Typically, the bonus opportunity is presented on related products, either from the supplier of the goods or service which is the subject of the primary game, or from the supplier of goods or services which are from a related field.

In a bonus opportunity prompt 218, the consumer is prompted to respond to the bonus opportunity, and in a bonus response step 220, the consumer so responds. At this point, the primary game ends, and the results are displayed in a display primary game results step 222. Referring now to FIG. 15, a screenshot of such a display is illustrated, with the results being shown as results display 224. It may be seen that the results may include information as to whether the consumer won the prize being played for or not. Alternately, based on the results, the consumer can be entered into a drawing for the prize, or for an alternate prize. The latter approach provides an ideal opportunity for an additional contact with the consumer at a later time.

In an updated scores/alternate games display 226, the consumer is provided with the option of receiving updates on the primary game and with the opportunity to begin play on the alternate game(s) selected. In the next step in the process, an update request prompt 228, the consumer is provided with the opportunity to receive updates on the progress of the primary game. As seen in FIG. 15, this can be accomplished with an e-mail notification button 230, which, when selected by the consumer, will result in the consumer being provided with updates by e-mail. Alternately, these updates could also be provided by voice e-mail, telephone call, pager alert, wireless e-mail, or by providing a toll-free telephone number for the consumer to call to see if they have won, or by other notifications which will be apparent to those skilled in the art. In the next step in the process, the consumer responds in an update opportunity response step 232.

Referring again to FIG. 15, the additional games which may be played are represented by three additional game buttons 234, 236, and 238. It may be seen that the third additional game button 238 is grayed out rather than being displayed distinctly as are the first and second additional game buttons 234 and 236. This is because the first and second additional game buttons 234 and 236 are the two additional games which were selected, while the third additional game button 238 was not selected. The consumer can play the first additional game by selecting the first additional game button 234, and the second additional game (if a second additional game was selected) by selecting the second additional game button 236.

Following the additional games being played, the process shown in FIG. 6 will move to an coupon display 240. This step, which is shown as a screenshot in FIG. 16, involves giving the consumer the results of the last additional game, which are shown as an additional game results display 242. In the preferred embodiment of the offline to online marketing program of the present invention, the consumer may be provided with a coupon, either for a free product or service, or for a discount on a product or service. Thus, there is a coupon presentation details display 244 displayed on the screen as seen in FIG. 16. By printing the screen in a screen print step 246, a coupon 248 appearing on the screenshot illustrated in FIG. 16 will be printed for use by the consumer. The process of FIG. 6 thus ends in an end step 250, completing the description of the preferred embodiment of the offline to online marketing program of the present invention.

In an optional additional step in the process, the consumer may be provided final results of the contest or a drawing in which the consumer has been entered based on the results of the primary game. As mentioned previously, such a notification can be provided by e-mail, voice e-mail, telephone call, pager alert, wireless e-mail, or by providing a toll-free telephone number for the consumer to call for the final results, or by other notifications which will be apparent to those skilled in the art.

As an alternate embodiment, the offline to online marketing program of the present invention could also be implemented in a system which offers hyperlinking from a button or icon contained in a conventional television broadcast to a related web site on a real-time basis without requiring a URL or Web address to be typed. The hardware for such a system may use equipment such as that offered by WorldGate Communications, Inc., and may utilize the Microsoft's TV Platform software. The WorldGate technology is discussed in U.S. Pat. No. 5,961,603, to Kunkel et al., and in U.S. Pat. No. 6,049,539, to Lee et al., both of which are assigned to WorldGate. U.S. Pat. No. 5,961,603 and U.S. Pat. No. 6,049,539 are each incorporated herein by reference.

In this system, rather than having a separate television and computer, a set-top box is used to connect a television both to a source of television programming and to the Internet. In this alternate embodiment of the offline to online marketing program of the present invention, a commercial will appear with the marketing website logo displayed therein. By selecting a button on the remote control for the set-top box, the user's television will move from the commercial to the third party marketing website.

The operation of the third party marketing website will be as described above, only using the set-top box remote control to navigate. Following the navigation of the third party marketing website, the user will be returned to the television channel which displayed the commercial. Since such systems can also time-shift programming to freeze or delay viewing, the programming can resume from the exact spot where the user initially pushed the remote control button to move to the third party marketing website.

It may therefore be appreciated from the above detailed description of the preferred embodiment of the present invention that it teaches a combination of television advertising with advertising use of the Internet in order to create an offline to online marketing program which achieves synergistic advantages over the use of separate television and Internet advertising campaigns. The offline to online marketing program of the present invention augments the performance level of television advertising only, and produces a verifiable increase in consumer awareness of the products or services advertised on television. It provides consumers with an incentive which will function to make them become more aware of the television commercials and which will also cause them to log on to the marketing program website, thereby presenting the opportunity to target them with further marketing information.

The offline to online marketing program of the present invention acts to build both a lasting memory of television advertising and a relationship between consumers and advertisers which is substantially greater than that which presently exists. It provides a source of marketing demographics which demographics, rather than being collected in arduous processes which involve projections and estimates, are provided by the consumers themselves, and thus are necessarily both complete and accurate. The offline to online marketing program of the present invention requires little change to be made in offline television ads in order to produce the synergistic and advantageous results mentioned above.

The offline to online marketing program of the present invention produces results which are achievable over an extended period of time with a variety of different advertised products and services, with the offline to online marketing program requiring few or no enhancements to be made to it for use with the various different products and services which are marketed. The offline to online marketing program of the present invention is also economical both to implement and to operate to enhance its market appeal and to thereby afford it the broadest possible market. Finally, all of the aforesaid advantages and objectives of the offline to online marketing program of the present invention are achieved without incurring any substantial relative disadvantage.

Although an exemplary embodiment of the offline to online marketing program of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention.

What is claimed is:

1. A method of increasing consumer awareness of products or services which are advertised in television commercials, comprising:
    enhancing a plurality of television commercials by displaying a marketing website logo during each of said plurality of enhanced television commercials;
    providing a marketing website which is associated with and identified by said marketing website logo and which is accessible by consumers;
    displaying to a consumer who has entered said marketing website in response to viewing a particular enhanced television commercial a list of television networks on which enhanced television commercials have aired, and prompting the consumer to select the particular television network on which the consumer viewed the particular enhanced television commercial;
    displaying to the consumer a list of television shows broadcasted by the particular television network during which television shows enhanced television commercials have been broadcasted, and prompting the consumer to select the particular television show during which the consumer viewed the particular enhanced television commercial;
    displaying to the consumer a list of enhanced television commercials which were broadcasted during the particular television show, and prompting the consumer to select the particular enhanced television commercial; and
    providing a game or contest for the consumer to play which game or contest provides information on or relates to the particular product or service advertised by the particular enhanced television commercial.

2. A method as defined in claim 1, wherein said enhancing step comprises:
    placing said marketing website logo in a prominent position during at least a portion of each of said television commercials.

3. A method as defined in claim 1, wherein said marketing website logo comprises:
    the Universal Resource Locator ("URL") address of said marketing website; and
    a stylized logo which contains said URL address of said marketing website.

4. A method as defined in claim 1, additionally comprising:
    enhancing printed materials which are transmitted to consumers by printing said marketing website logo thereupon.

5. A method as defined in claim 4, wherein said printed materials comprise at least one of the group consisting of:
    billing statements, print advertisements, telephone advertisements, and billboards.

6. A method as defined in claim 1, wherein said step of displaying a list of television networks comprises:
    displaying a readily recognizable logo for each of said television networks on which at least one enhanced television commercial has aired.

7. A method as defined in claim 6, additionally comprising:
    printing said marketing website logo on at least one type of printed material which is provided to consumers; and
    displaying, simultaneously with said step of displaying a list of television networks, a readily recognizable logo or other indicia that identifies said type of printed material.

8. A method as defined in claim 1, wherein said step of displaying a list of television shows comprises:
    displaying a readily recognizable name or logo for each of said television shows during which at least one enhanced television commercials has aired.

9. A method as defined in claim 1, wherein said step of displaying a list of enhanced television commercials comprises:
    displaying a separate information element associated with each enhanced television commercial which was broadcasted.

10. A method as defined in claim 9, wherein said information element comprises:
    at least one item selected from the group consisting of the name of a company which manufactures or sells a product or service being advertised, a model name or number of a product or service being advertised, and information about a prize being awarded in said game or contest.

11. A method as defined in claim 1, wherein said prompting steps lead the consumer to make the appropriate selection by placing a cursor of a mouse on a desired location and clicking a button of the mouse to make the selection.

12. A method as defined in claim 1, additionally comprising:
obtaining demographic information from the consumer.

13. A method as defined in claim 12, wherein said obtaining step comprises:
obtaining information about the consumer regarding at least two items from the group consisting of the consumer's gender, the consumer's age, the consumer's relationship status, the consumer's residential occupancy type, the consumer's zip code, the consumer's salary bracket or household income, the consumer's household size, and the consumer's television viewing or radio listening habits.

14. A method as defined in claim 1, additionally comprising:
requiring each consumer accessing said marketing website to register by providing certain information prior to said providing step.

15. A method as defined in claim 14, wherein said information comprises:
at least two items from the group consisting of the consumer's name, the consumer's e-mail address, the consumer's address, and the consumer's zip code.

16. A method as defined in claim 14, wherein said requiring step comprises:
determining whether the consumer has previously registered;
if the consumer has previously registered, requiring the consumer to log in; and
if the consumer has not previously registered, requiring the consumer to register.

17. A method as defined in claim 1, wherein said providing step comprises:
providing to the consumer the game or contest related to the particular product or service advertised by the particular enhanced television commercial; and
upon completion of the game or contest related to the particular product or service advertised by the particular enhanced television commercial, providing to the consumer the consumer's score or standing.

18. A method as defined in claim 17, wherein said providing step additionally comprises:
providing to the consumer the option to be notified of the final game or contest results and allowing the consumer to select said option.

19. A method as defined in claim 18, wherein if the consumer has selected the option to be notified of the final game or contest results, said notification is provided by one of the delivery mechanisms selected from the group consisting of e-mail, voice e-mail, pager alert, wireless e-mail, or by providing a toll-free telephone number.

20. A method as defined in claim 1, wherein said providing step comprises:
displaying to the consumer a plurality of additional games or contests which can be played;
prompting the consumer to select at least one additional game or contest to be played;
upon selection by the consumer of such additional game(s) or contest(s) to be played, or the consumer declining to do so, providing to the consumer the game or contest related to the particular product or service advertised by the particular enhanced television commercial; and
if the consumer has selected an additional game(s) or contest(s), following completion of the game or contest related to the particular product or service advertised by the particular enhanced television commercial, providing to the additional game(s) or contest(s) selected.

21. A method as defined in claim 20, wherein said additional games or contests are related to products or services which in turn are related to the particular product or service advertised by the particular enhanced television commercial.

22. A method as defined in claim 20, further comprising:
delivering a coupon to the consumer following the completion of at least one of the additional games, wherein said coupon may be printed by said consumer.

23. A method as defined in claim 1, wherein said game or contest comprises:
a game or contest in which the consumer is required to provide information from the particular enhanced commercial, and the scoring for such game or contest is based upon the degree to which such information is correctly provided.

24. A method as defined in claim 1, wherein by obtaining a sufficient score in said game or contest, the consumer is entered into a drawing for a prize.

25. A method of increasing consumer awareness of a product or service which is advertised in a television commercial, comprising:
displaying a marketing website logo during the television commercial;
providing a marketing website which is associated with and identified by said marketing website logo and which is accessible by consumers;
displaying to a consumer who has entered said marketing website in response to viewing the television commercial a list of television networks on which television commercials which display said marketing website logo have been broadcasted, and prompting the consumer to select the television network on which the consumer viewed the television commercial;
in response to the consumer's selection of a particular television network, displaying to the consumer a list of television shows broadcasted by the particular television network during which television shows television commercials which display said marketing website logo have been broadcasted, and prompting the consumer to select the television show during which the consumer viewed the television commercial;
in response to the consumer's selection of a particular television show, displaying to the consumer a list of television commercials which display said marketing website logo and which were broadcasted during the selected television show, and prompting the consumer to select the television commercial; and
in response to the consumer's selection of the television commercial, providing a game or contest for the consumer to play which game or contest provides information on or relates to the particular product or service advertised by the television commercial.

26. A method of increasing consumer awareness of products or services which are advertised in television commercials, comprising:
enhancing a plurality of television commercials by displaying a marketing website logo during each of said plurality of enhanced television commercials;
providing a marketing website which is associated with and identified by said marketing website logo and which is accessible by consumers;
displaying to a consumer who has entered said marketing website in response to viewing a particular enhanced television commercial a list of television networks on which enhanced television commercials have aired, and prompting the consumer to select the particular television network on which the consumer viewed the particular enhanced television commercial;

in response to the consumer's selection of a particular television network, displaying to the consumer a list of television shows broadcasted by the particular television network during which television shows enhanced television commercials have been broadcasted, and prompting the consumer to select the particular television show during which the consumer viewed the particular enhanced television commercial;

in response to the consumer's selection of a particular television show, displaying to the consumer a list of enhanced television commercials which were broadcasted during the particular television show, and prompting the consumer to select the particular enhanced television commercial; and in response to the consumer's selection of the particular enhanced television commercial, providing a game or contest in which the consumer may play for a prize or award, which game or contest provides information on or relates to the particular product or service advertised by the particular enhanced television commercial.

27. A method of enhancing the marketing of products or services which are advertised in television commercials, comprising:

providing a marketing website which is associated with an indicia and which is accessible by consumers;

enhancing a plurality of television commercials by displaying said indicia which is associated with said marketing website during each of said plurality of enhanced television commercials;

providing incentives to motivate consumers to enter said marketing website in response to viewing enhanced television commercials;

displaying to a consumer who has entered said marketing website in response to viewing a particular enhanced television commercial a series of screens which prompt the consumer to select the particular enhanced television commercial viewed by the consumer; and providing marketing information relating to the product advertised by the particular enhanced television commercial viewed by the consumer in a manner which is associated with said incentives.

28. A method of marketing products or services, comprising:

providing a marketing website having a particular web address;

broadcasting said web address in conjunction with each of a plurality of television commercials;

first, allowing a consumer entering said marketing website to select the particular television network on which the consumer viewed a particular one of said plurality of television commercials;

second, allowing the consumer to select the particular television show during which the consumer viewed said particular television commercial;

third, allowing the consumer to select said particular television commercial; and fourth, providing marketing information relating to the product advertised by the particular enhanced television commercial in a manner which the consumer finds gratifying.

* * * * *